United States Patent
Eitan

(10) Patent No.: US 8,295,307 B2
(45) Date of Patent: Oct. 23, 2012

(54) SYSTEM AND METHOD FOR ADAPTING TRANSMIT DATA BLOCK SIZE AND RATE BASED ON QUALITY OF COMMUNICATION LINK

(75) Inventor: Alecsander P. Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 12/437,393

(22) Filed: May 7, 2009

(65) Prior Publication Data
US 2010/0284424 A1    Nov. 11, 2010

(51) Int. Cl.
*H04J 3/16* (2006.01)
*G01R 31/08* (2006.01)

(52) U.S. Cl. .................... 370/470; 370/235

(58) Field of Classification Search .......... 370/229, 370/231–235, 236, 252–253, 332–333, 470–472; 725/95–96; 709/232–235, 225
See application file for complete search history.

(56) References Cited

U.S. PATENT DOCUMENTS

| | | | | |
|---|---|---|---|---|
| 5,898,682 A * | 4/1999 | Kanai | ............. | 370/331 |
| 6,393,480 B1 * | 5/2002 | Qin et al. | ............. | 709/224 |
| 2006/0092838 A1 * | 5/2006 | Lee | ............. | 370/229 |
| 2006/0153150 A1 * | 7/2006 | Yang et al. | ............. | 370/338 |
| 2007/0195820 A1 * | 8/2007 | So et al. | ............. | 370/470 |
| 2007/0230630 A1 | 10/2007 | Tran | | |
| 2007/0263572 A1 * | 11/2007 | Ren et al. | ............. | 370/338 |
| 2008/0155148 A1 | 6/2008 | Oyman | | |
| 2009/0080403 A1 * | 3/2009 | Hamdi | ............. | 370/345 |
| 2010/0158032 A1 * | 6/2010 | Carlsson | ............. | 370/412 |

FOREIGN PATENT DOCUMENTS
EP   1162774 A1   12/2001
EP   1827042      8/2007

OTHER PUBLICATIONS
International Search Report and Written Opinion -PCT/US2010/033943, International Search Authority—European Patent Office—Aug. 5, 2010.

* cited by examiner

*Primary Examiner* — Kwang B Yao
*Assistant Examiner* — Tung Q Tran
(74) *Attorney, Agent, or Firm* — Kevin T. Cheatham

(57) ABSTRACT

System and method for transmitting data to a remote communication device to achieve desirable transmit data block size and data rate based on measurements of the communication link quality to the remote device. The method entails selecting an initial transmit data rate and power based on an initial measurement of the link quality, and a default size for the transmit data block. The data block is then transmitted to the remote, and an acknowledgement (ACK) message is received from the remote. If the ACK message indicates that the data block was properly received, the size for the next data block to be transmitted is increased. Otherwise, the size for the next data block may be decreased or remain the same. Additionally, the transmit data rate may be increased if the remote properly receives a defined number of consecutive data blocks, or decreased if the remote does not receive a defined number of consecutive data blocks.

18 Claims, 2 Drawing Sheets

SYSTEM AND METHOD FOR ADAPTING TRANSMIT DATA BLOCK SIZE AND RATE BASED ON QUALITY OF COMMUNICATION LINK

FIELD

The present disclosure relates generally to communication systems, and more specifically, to a system and method for adapting the size of a transmit data block and rate based on the quality of the communication link.

BACKGROUND

In many communication systems, especially time division duplex (TDD) systems, there are generally two main methods for providing acknowledgment (ACK) for successful reception of data packets. In both methods, in response to receiving data packets from a source communication device, a destination communication device sends an ACK message back to the source communication device to inform it about packets that were successfully received and possibly about packets that were not correctly received. This allows the source communication device to retransmit those packets that were not properly received by the destination communication device.

According to one ACK method, the destination communication device sends an ACK message after each received data packet or frame. This provides the source communication device with "instant" feedback regarding the transmission of the packet or frame. Because of the "instant" feedback, the technique has the advantage of allowing the communication devices to adapt relatively fast to changes in the communication link environment. That is, the source communication device can lower the transmit data rate if the packets are frequently not being properly received by the destination communication device. Or, conversely, the source communication device can raise the transmit date rate if the packets are frequently being properly received by the destination communication device. However, the disadvantage of this technique is that the transmission of ACK messages typically adds to the overhead of the communication session, and consequently reduces the transmission efficiency of the session.

According to the other ACK method, the destination communication device sends an ACK message after receiving a block of packets or frames. Because fewer ACK messages are transmitted for a given amount of data transmitted, the communication session generally has less overhead and thus may be able to achieve higher transmission efficiencies. However, the disadvantage of this technique is that the communications devices may not be able to adapt responsively to a fast changing communication link environment.

Although in the above example the two communication devices were referred to as the source and destination devices, it shall be understood that the devices may be bidirectional. That is, the two devices operate both as a source device (if they are transmitting data) and a destination (if they are receiving data). Accordingly, their roles may change over time and they may be interlaced. Additionally, each of these devices may communicate with more than just the other device, but may have several simultaneous communication sessions with other devices.

SUMMARY OF THE DISCLOSURE

An aspect of the disclosure relates to a system and method for transmitting data to a remote communication device to achieve a desirable transmit data block size and data rate based on one or more indicators of the communication link quality to the remote device. The transmit methodology entails selecting an initial transmit data rate and power based on an initial measurement of the link quality, and a default size for the transmit data block. The data block is then transmitted to the remote, and an acknowledgement (ACK) message is received from the remote device. If the ACK message indicates that the data block was properly received, the size for the next data block to be transmitted is increased. If the ACK message or lack thereof indicates that the data block was not received, the size for the next data block may be decreased or remain the same. Additionally, the transmit data rate may be increased if the remote device properly receives a defined number of consecutive data blocks, or decreased if the remote device does not receive a defined number of consecutive data blocks. In this manner, a substantially optimal data block size and rate may be achieved based on the current quality of the communication link to the remote device.

Other aspects, advantages and novel features of the present disclosure will become apparent from the following detailed description of the disclosure when considered in conjunction with the accompanying drawings.

DETAILED DESCRIPTION

Various aspects of the disclosure are described below. It should be apparent that the teachings herein may be embodied in a wide variety of forms and that any specific structure, function, or both being disclosed herein are merely representative.

Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1:
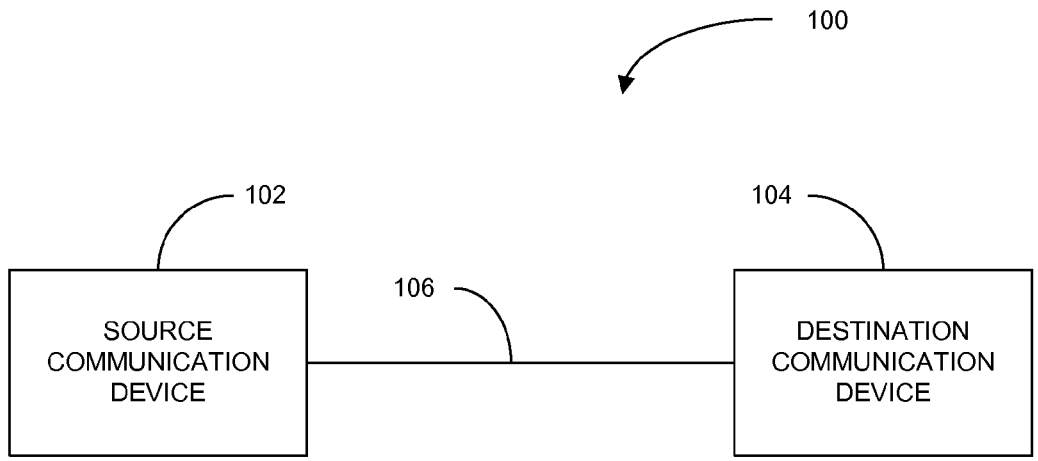
FIG. 1 illustrates a block diagram of an exemplary communications system in accordance with an aspect of the disclosure.

FIG. 1 illustrates a block diagram of an exemplary communication system 100 in accordance with an aspect of the disclosure. The communication system 100 comprises a source communication device 102, and a destination communication device 104 communicatively coupled to the source communication device 102 via a communication medium 106. The communication devices 102 and 104 each may be any device that are able to send blocks of data and acknowledgement (ACK) thereof to each other by way of the communication medium 106. In this example, the communication device 102 is the "source" because it is transmitting blocks of data to the destination communications device 104. The communication device 104 is the "destination" because it receives the blocks of data from the source communication device 102, and sends responsive ACK messages to the source communication device 102. The communication medium 106 may be any medium through which blocks of data and ACK messages may be communicated between the source and destination devices, such as a wired medium, wireless medium, or combination thereof.

As discussed in more detail below, the source communication device 102 adjusts the size of the transmitted data blocks and the transmitted data rates based on indicators of the quality of the communication link between the source and destination communication devices 102 and 104. In particular, the source communication device 102 initially selects a transmit data rate based on one or more current indicators of the quality of the communication link between the source and destination devices 102 and 104. For example, the link quality indicators may include a measured power of the pilot signal received from the destination communication device 104, and a determination of frame error rate (FER) versus carrier-to-noise (C/No) from an analysis of the pilot data received from the destination communication device. The source communication device 102 will initially configure the data blocks to be transmitted to have a default or initial size (e.g., a length of one packet or frame).

The source communication device 102 then transmits each data block and receives a corresponding ACK message or lack thereof from the destination communication device 104. Each time source communication device 102 receives an ACK message indicating a successful reception of a data block from the destination communication device 104, the source communication device 102 increases the size of the transmit data block (e.g., by a factor of two (2)). If the source communication device 102 receives a predetermined number of consecutive ACK messages indicating successful reception of the corresponding data blocks, the source communication device 102 increases the transmit data rate, reduces the data block size to the default or initial value, and repeats the data transmission process.

Similarly, each time the source communication device 102 receives an ACK message indicating a failed reception of a data block (or lack of an ACK message within the designated time interval) from the destination communication device 104, the source communication device 102 decreases the size of the transmit data block (e.g., by a factor of two (2)) or keeps it the same if it has reached the minimum block size. If the source communication device 102 receives a predetermined number of consecutive ACK messages (or lack thereof) indicating failed reception of the corresponding data blocks, the source communication device 102 decreases the transmit data rate, sets the data block size to the default or initial value, and repeats the data transmission process again.

In this manner, the communication devices 102 and 104 achieve a substantially optimal data block size and data rate for the current condition of the communication link. It shall be understood that changing the data rate as described herein may include changing one or more of the following: coding rate, modulation, digital hierarchy, transmission power, antenna directivity, MIMO scheme, and others. The data block size and data rate optimization technique is explained in more detail with reference to the following exemplary flow diagram of the data transmission methodology.

Figure 2:
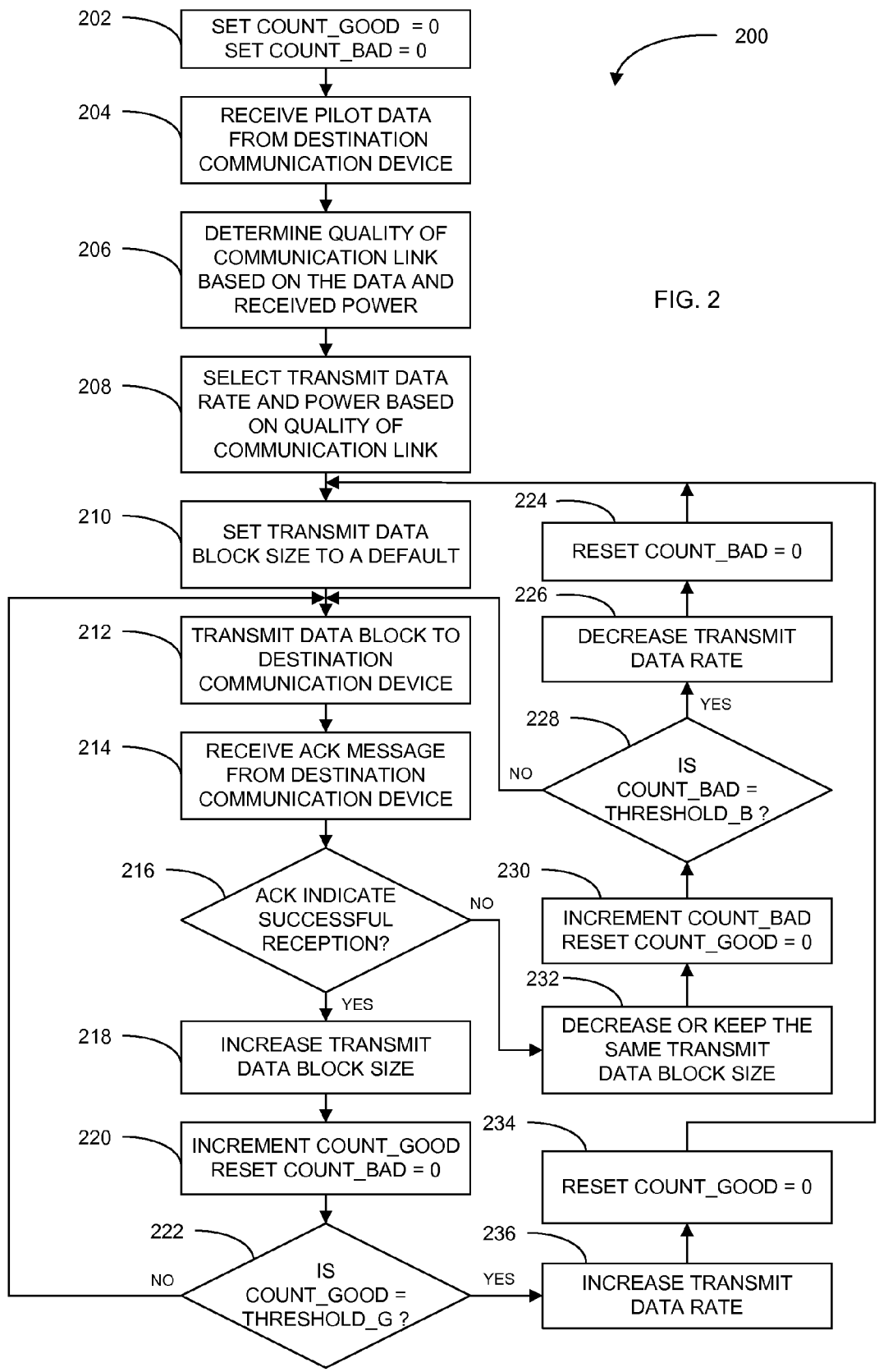
FIG. 2 illustrates a flow diagram of an exemplary method of transmitting data in accordance with another aspect of the disclosure.

FIG. 2 illustrates a flow diagram of an exemplary method 200 of transmitting data in accordance with another aspect of the disclosure. According to the method 200, the source communication device 102 initializes a couple of parameters COUNT_GOOD and COUNT_BAD to zero (0) (step 202). As discussed in more detail below, the parameter COUNT_GOOD is used to keep track of the number of consecutive ACK messages received indicating a successful reception of a data block, for the purpose of increasing the data rate when a condition is met. Similarly, the parameter COUNT_BAD is used to keep track of the number of consecutive ACK messages received (or absence thereof) indicating a failed reception of a data block, for the purpose of decreasing the data rate when a condition is met.

The source communication device 102 also receives the pilot signal from the destination communication device 104 (step 204). The reference to pilot signal includes any part of any signal transmitted by the destination device, given that the parameters of the transmission are known to the source and detectable by the source (e.g., pilots, beacon, preamble, etc.). Based on the pilot signal, the source communication device 102 determines the quality of the communication link to the destination communication device 104 (step 206). For example, the source communication device 102 may determine the received power and carrier-to-noise ratio (C/No) of the pilot signal, as well as the frame error rate (FER) based on the pilot data. It shall be understood that the source communication device 102 may use other or additional information to arrive at a measurement of the quality of the communication link.

The source communication device 102 then selects a transmit data rate and power based on the measured quality of the communication link to the destination communication device 104 (step 208). For example, if the measurement indicates a relatively good communication link, the source communication device 102 may select a relatively high initial transmit data rate and a relatively low initial transmit power. On the other hand, if the measurement indicates a relatively poor communication link, the source communication device 102 may select a relatively low initial transmit data rate and a relatively high initial transmit power. The source communication device 102 then sets the transmit data block size to a default value (e.g., a minimum size, such as the length of one (1) packet or frame) (step 210).

The source communication device 102 then transmits a block of data to the destination communication device 104 with the current transmit power, data rate, and block size (step 212). The source destination device 102 may then receive an ACK message from the destination communication device 104 (or may not receive an ACK message during the time it should) (step 214). Based on the received ACK message or lack thereof, the source communication device 102 determines whether the transmitted data block was successfully received by the destination communication device 104 (step 216).

If in step 216 the source communication device 102 determines that the data block was successfully received, the source communication device increases the size of the data block (e.g., by a factor of two (2)) for the next transmission cycle or may keep it the same if it has reached a defined maximum value (step 218). The source communication device 102 also increments the parameter COUNT_GOOD and resets the parameter COUNT_BAD to zero (0) (step 220). The source communication device 102 then determines whether the parameter COUNT_GOOD is equal to a defined threshold THREHSOLD_G (step 222). If in step 222 the source communication device 102 determines that COUNT_GOOD is not equal to the threshold THRESHOLD_G, the source communication device 102 proceeds to step 212 to transmit a new block of data with the current power, data rate, and (new) data block size.

If, on the other hand, in step 222 the source communication device 102 determines that parameter COUNT_GOOD is equal to the defined threshold THRESHOLD_G, the source communication device increases the transmit data rate (step 236). The source communication device 102 also resets the parameter COUNT_GOOD to zero (0) (step 234). The source communication device 102 then proceeds to step 210 where it sets the transmit data block size again to the default value (e.g., the length of one (1) packet or frame). Thus, each time the transmit data rate is increased, the data block size is reset back to the default value. The source communication device 102 then proceeds to step 212 to transmit a new block of data with the current power, (new) data rate, and (default) data block size.

If, on the other hand, in step 216 the source communication device 102 determines that the reception of the transmitted data block by the destination communication device 104 was not successful, the source communication device 102 decreases the data block size (e.g., by a factor of two (2)) or keeps the data block size the same if it is at the minimum block size (step 232). The source communication device 102 also increments the parameter COUNT_BAD and resets the parameter COUNT_GOOD to zero (0) (step 230). The source communication device 102 then determines whether the parameter COUNT_BAD is equal to a defined threshold THRESHOLD_B (step 228). If in step 228 the source communication device 102 determines that COUNT_BAD is not equal to the threshold THRESHOLD_B, the source communication device 102 proceeds to step 212 to transmit a new block of data with the current power, data rate, and (possibly new) data block size.

If, on the other hand, in step 228 the source communication device 102 determines that parameter COUNT_BAD is equal to the defined threshold THRESHOLD_B, the source communication device decreases the transmit data rate (step 226). The source communication device 102 also resets the parameter COUNT_BAD to zero (0) (step 224). The source communication device 102 then proceeds to step 210 where it sets the transmit data block size again to the default value (e.g., the length of one (1) packet or frame). Similarly, each time the transmit data rate is decreased, the data block size is reset back to the default value. The source communication device 102 then proceeds to step 212 to transmit a new block of data with the current power, (new) data rate, and (default) data block size.

This exemplary technique allows the source and destination communication devices to achieve a communication session with a transmit data rate and data block size that are substantially optimal or desirable with regard to the current condition of the channel link. The initial steps 204-208 allow the communication devices to select an initial transmit data rate that is a good approximation of an optimal data rate based on the current measurement of the link quality. The loops comprising respective steps 212-222 and 212-228 allow the communication devices to achieve a substantially optimal data block size for the current condition of the channel link. Similarly, the loops comprising respectively 210-234 and 210-224 allow the communication devices to achieve a substantially optimal data rate for the current condition of the channel link.

The above methodology is merely one example of achieving a substantially optimal transmit block size and rate, others are possible. For example, instead of having two parameters COUNT_GOOD and COUNT_BAD, one count may be used to cumulatively keep track of the successful and unsuccessful ACK messages, whereby the count is incremented each time a successful ACK message is received, and decremented each time an unsuccessful ACK message is received. In such a case, the threshold parameters THRESHOLD_G and THRESHOLD_B would be positive and negative integers, respectively. The following describes a more specific exemplary embodiment of the source communication device 102 that implements the transmission methodology described herein.

Figure 3:
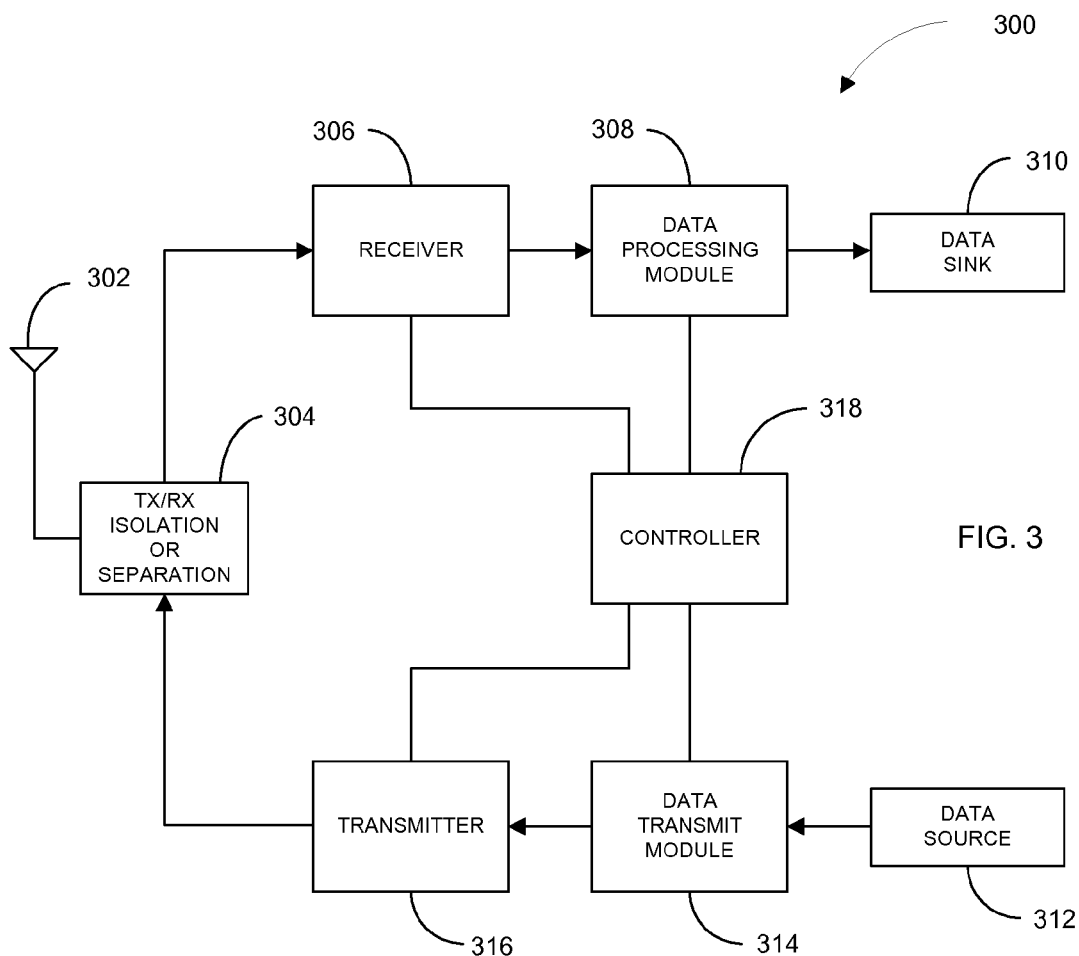
FIG. 3 illustrates a block diagram of an exemplary communication apparatus in accordance with another aspect of the disclosure.

FIG. 3 illustrates a block diagram of an exemplary communication device 300 in accordance with another aspect of the disclosure. The communication device 300 may be one exemplary implementation of the source communication device 102 previously discussed. In particular, the communication device 300 comprises an antenna 302, a Tx/Rx isolation or separation device 304, a receiver 306, a data processing module 308, a data sink 310, a data source 312, a data transmit module 314, a transmitter 316, and a controller 318.

The data source 312 generates data for transmission to a destination communication device, and provides the data to the data transmit module 314. The data transmit module 314, in turn, forms the data blocks with the appropriate size and rates for transmission to the destination communication device. The data transmit module 314 provides the data blocks to the transmitter 316 which forms a signal for transmission via a wireless medium. The transmitter then sends the signal to the antenna 302 via the Tx/Rx isolation or separation device 304 for radiation into the wireless medium. The data source 312 may be any device that generates data, such as a sensor, a microprocessor, a microcontroller, a RISC processor, a keyboard, a pointing device such as a mouse or a track ball, an audio device, such as a headset, including a transducer such as a microphone, a medical device, a shoe, a robotic or mechanical device that generates data, a user interface, such as a touch-sensitive display, etc.

Additionally, the receiver 306 receives a signal from the destination communication device by way of the antenna 302 and TxRx isolation or separation device 304. The signal may include an ACK message and pilot data from the destination communication device. The receiver 306 extracts the data information from the signal, and provides it to the data processing module 308. The data processing module 308 attempts to validate the received data, and if validated, provides at least some of the data to the data sink 310 and at least some to the controller 318. The data sink 310 may be any device that utilizes the received data, such as a microprocessor, a microcontroller, a RISC processor, an audio device, such as a headset, including a transducer such as a speaker, a medical device, a shoe, a robotic or mechanical device that responds to received data, a user interface, such as a display, one or more light emitting diodes (LED), etc.

With regard to the exemplary method 200 of transmitting data blocks for achieving substantially optimal block size, data rates, and power, the controller 318 initializes the parameters COUNT_GOOD and COUNT_BAD per step 202, receives a measurement of the power of the destination pilot signal from the receiver 306 and the pilot data from the data processing module 308 per step 204, and determines the quality of the communication link from the received power and pilot data per step 206. The controller 318 then selects the transmit data rate and power based on the quality of the communication link per step 208, and selects a default block size per block 210. The controller 318 controls the data transmit module 314 in configuring the data blocks for the selected block size and data rate, and controls the transmitter 316 in configuring the transmit signal with the selected transmit power. The data transmit module 314 and transmitter 316 then transmits the signal carrying the data block to the destination communication device via the Tx/Rx isolation device 304 and antenna 302 per step 212.

The receiver receives the signal carrying the ACK message and provides it to the data processing module 308 per step 214. The data processing module 308 then determines whether the ACK message indicates a successful reception of the transmitted data block, and informs the controller 318 accordingly per step 216. Depending on whether there was a successful reception or not of the transmitted data block, the controller 318 performs some or all of the steps 218-236 as previously discussed, to achieve a substantially optimal transmit data block size and data rate for the current condition of the communication link to the destination communication device.

Any of the above aspects of the disclosure may be implemented in many different devices. For example, in addition to medical applications as discussed above, the aspects of the disclosure may be applied to health and fitness applications.

Additionally, the aspects of the disclosure may be implemented in shoes for different types of applications. There are other multitude of applications that may incorporate any aspect of the disclosure as described herein.

Various aspects of the disclosure have been described above. It should be apparent that the teachings herein may be embodied in a wide variety of forms and that any specific structure, function, or both being disclosed herein is merely representative.

Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of transmitting data, the method comprising:
   transmitting a first data block of a first size to a destination device, wherein transmitting the first data block is at a first data transmission rate;
   in response to receiving an acknowledgement (ACK) message indicating a successful reception by the destination device of the first data block, transmitting a second data block of a second size to the destination device, wherein the second size is larger than the first size;
   in response to receiving a threshold number of consecutive ACK messages indicating that data blocks were successfully received by the destination device, transmitting a third data block of a third size to the destination device, wherein the third size is smaller than the second size, and wherein transmitting the third data block is at a second data transmission rate that is greater than the first data transmission rate.

2. The method of claim 1, further comprising:
   receiving a second ACK message indicating a successful reception by the destination device of the third data block of the third size;
   in response to receiving the second ACK message, transmitting a fourth data block of a fourth size to the destination device, wherein the fourth size is larger than the third size.

3. The method of claim 1, further comprising:
   in response to determining that the destination device did not successfully receive a threshold number of consecutive data blocks transmitted at a third data transmission rate, transmitting a fourth data block at a fourth data transmission rate, wherein the fourth data transmission rate is lower than the third data transmission rate.

4. The method of claim 1, further comprising:
   in response to determining that the destination device did not successfully receive a fourth data block of a fourth size, transmitting a fifth data block of a fifth size to the destination device, wherein the fifth size is a smaller size than the fourth size.

5. The method of claim 4, wherein determining that the destination device did not successfully receive the fourth data block of the fourth size comprises not receiving an ACK message for the fourth data block.

6. The method of claim 1, further comprising:
   receiving a pilot signal from the destination device;
   determining a quality of a communication link to the destination device based on the pilot signal;
   selecting a first data transmission rate based on the quality.

7. The method of claim 6, wherein determining the quality comprises determining the quality based on one or more of a measured power of the pilot signal, a determination of a frame error rate, and a determination of a carrier-to-noise ratio.

8. A communication apparatus for transmitting data, the apparatus comprising:
   a transmitter configured to transmit a first data block of a first size to a destination device,
      wherein the first data block is transmitted at a first data transmission rate;
   a controller configured to
      in response to receiving an acknowledgement (ACK) message indicating a successful reception of the first data block by the destination device, cause the transmitter to transmit a second data block of a second size to the destination device, wherein the second size is larger than the first size;
      in response to receiving a threshold number of consecutive ACK messages indicating that data blocks were successfully received by the destination device, cause the transmitter to transmit a third data block of a third size to the destination device, wherein the third size is smaller than the second size, and wherein the third data block is transmitted at a second data transmission rate that is greater than the first data transmission rate.

9. The communication apparatus of claim 8, wherein the controller is further configured to:
   in response to receiving a second ACK message indicating a successful reception by the destination device of the third data block of the third size, cause the transmitter to transmit a fourth data block of a fourth size to the destination device, wherein the fourth size is larger than the third size.

10. The communication apparatus of claim 8, wherein the controller is further configured to:
    in response to determining that the destination device did not successfully receive a threshold number of consecutive data blocks transmitted at a first data transmission rate, cause the transmitter to transmit a fourth data block at a third data transmission rate, wherein the third data transmission rate is lower than the second data transmission rate.

11. The communication apparatus of claim 8, wherein the controller is further configured to:
    in response to determining that the destination device did not successfully receive a fourth data block of a fourth size, cause the transmitter to transmit a fifth data block of a fifth size to the destination device, wherein the fifth size is a smaller size than the fourth size.

12. The communication apparatus of claim 11, wherein determining that the destination device did not successfully receive the fourth data block of the fourth size comprises not receiving an ACK message for the fourth data block.

13. The communication apparatus of claim 8, further comprising:
    a receiver configured to receive a pilot signal from the destination device; and
    wherein the controller is further configured to
       determine a quality of communication link to the destination device based on the pilot signal;
       select a first data transmission rate based on the quality.

14. The communication apparatus of claim 13, wherein the controller determines the quality of communication link based on one or more of a measured power of the pilot signal, a determination of a frame error rate, and a determination of a carrier-to-noise ratio.

15. An apparatus for transmitting data, the apparatus comprising:
    means for transmitting a first data block of a first size to a destination device, wherein the first data block is transmitted at a first data transmission rate;
    means for transmitting a second data block of a second size to the destination device in response to receiving an acknowledgement (ACK) message indicating a successful reception by the destination device of the first data block, wherein the second size is larger than the first size;
    means for transmitting a third data block of a third size to the destination device in response to receiving a threshold number of consecutive ACK messages indicating that data blocks were successfully received by the destination device, wherein the third size is smaller than the second size, and wherein the third data block is transmitted at a second data transmission rate that is greater than the first data transmission rate.

16. The apparatus of claim 15, further comprising:

means for receiving a second ACK message indicating a successful reception by the destination device of the third data block of the third size;

means for transmitting a fourth data block of a fourth size to the destination device in response to receiving the second ACK message, wherein the fourth size is larger than the third size.

17. A non-transitory, computer-readable storage medium comprising instructions that upon execution by one or more processors cause the one or more processors to:

transmit a first data block of a first size to a destination device, wherein transmitting the first data block is at a first data transmission rate;

transmit a second data block of a second size to the destination device in response to receiving an acknowledgement (ACK) message indicating a successful reception by the destination device of the first data block, wherein the second size is larger than the first size;

transmit a third data block of a third size to the destination device in response to receiving a threshold number of consecutive ACK messages indicating that data blocks were successfully received by the destination device, wherein the third size is smaller than the second size, and wherein the third data block is transmitted at a second data transmission rate that is greater than the first data transmission rate.

18. The computer-readable storage medium of claim 17, further comprising instructions that upon execution by the one or more processors cause the one or more processors to:

receive a second ACK message indicating a successful reception by the destination device of the third data block of the third size;

transmit a fourth data block of a fourth size to the destination device in response to receiving the second ACK message, wherein the fourth size is larger than the third size.

* * * * *